United States Patent
Matsuki et al.

(10) Patent No.: US 11,034,922 B2
(45) Date of Patent: Jun. 15, 2021

(54) CLEANING AGENT COMPOSITION

(71) Applicant: The Yokohama Rubber Co., LTD., Tokyo (JP)

(72) Inventors: Yuichi Matsuki, Hiratsuka (JP); Megumi Abe, Hiratsuka (JP)

(73) Assignee: The Yokohama Rubber Co., LTD.

( * ) Notice: Subject to any disclaimer, the term of this patent is extended or adjusted under 35 U.S.C. 154(b) by 118 days.

(21) Appl. No.: 16/308,393

(22) PCT Filed: Apr. 27, 2017

(86) PCT No.: PCT/JP2017/016713
§ 371 (c)(1),
(2) Date: Dec. 7, 2018

(87) PCT Pub. No.: WO2017/212823
PCT Pub. Date: Dec. 14, 2017

(65) Prior Publication Data
US 2019/0264145 A1 Aug. 29, 2019

(30) Foreign Application Priority Data
Jun. 7, 2016 (JP) .............. JP2016-113385

(51) Int. Cl.
*C11D 3/32* (2006.01)
*C11D 7/24* (2006.01)
*C11D 7/26* (2006.01)
*C11D 7/50* (2006.01)
*C09J 5/02* (2006.01)
*C11D 7/32* (2006.01)
*C11D 11/00* (2006.01)

(52) U.S. Cl.
CPC .............. *C11D 7/3263* (2013.01); *C09J 5/02* (2013.01); *C11D 7/24* (2013.01); *C11D 7/241* (2013.01); *C11D 7/26* (2013.01); *C11D 7/264* (2013.01); *C11D 7/265* (2013.01); *C11D 7/50* (2013.01); *C11D 7/5022* (2013.01); *C11D 7/5027* (2013.01); *C11D 11/007* (2013.01); *C11D 11/0035* (2013.01)

(58) Field of Classification Search
CPC .... C11D 3/32; C11D 7/24; C11D 7/26; C11D 7/264; C11D 7/50; C09J 5/02
See application file for complete search history.

(56) References Cited

U.S. PATENT DOCUMENTS

| | | | |
|---|---|---|---|
| 4,908,297 A | 3/1990 | Head et al. | |
| 5,451,345 A * | 9/1995 | Hatton .................... | B05D 3/10 134/1 |
| 5,674,478 A | 10/1997 | Dodd et al. | |
| 7,651,993 B2 | 1/2010 | Yamamoto et al. | |
| 2003/0158076 A1 * | 8/2003 | Rodrigues ............... | A61K 8/84 510/475 |
| 2006/0017769 A1 | 1/2006 | Akiyama et al. | |

FOREIGN PATENT DOCUMENTS

| | | |
|---|---|---|
| CN | 87 1 06226 | 3/1988 |
| CN | 1213293 | 4/1999 |
| CN | 1515639 | 7/2004 |
| CN | 1532566 | 9/2004 |
| CN | 1894293 | 1/2007 |
| CN | 101289525 | 10/2008 |
| JP | H07-053753 | 2/1995 |
| JP | 2001-311097 | 11/2001 |
| JP | 2005-075872 | 3/2005 |
| JP | 2006-035467 | 2/2006 |
| JP | 2010-150373 | 7/2010 |
| JP | 2014-025000 | 2/2014 |
| WO | WO 97/25964 | 7/1997 |
| WO | WO 2005/058990 | 6/2005 |

OTHER PUBLICATIONS

International Search Report for International Application No. PCT/JP2017/016713 dated Jun. 20, 2017, 4 pages, Japan.

* cited by examiner

*Primary Examiner* — Brian P Mruk
(74) *Attorney, Agent, or Firm* — Thorpe North & Western

(57) ABSTRACT

Provided is a cleaning agent composition for use in an adhesion process for applying an adhesive to a surface of a first member subjected to a dry treatment without a primer, and adhering a second member to the surface of the first member. The cleaning agent comprises a compound (A) having a (meth)acryloyl group and a liquid (B) having a boiling point of not higher than 200° C.

6 Claims, No Drawings

US 11,034,922 B2

CLEANING AGENT COMPOSITION

TECHNICAL FIELD

The present technology relates to a cleaning agent composition.

BACKGROUND ART

Conventionally, a steel plate has been used for interior and exterior parts of an automobile, such as a body, a front door, a rear door, a back door, a front bumper, a rear bumper, and a rocker molding of an automobile. From the viewpoint of decreasing the weight of an automobile, a crystalline thermoplastic resin such as a polypropylene resin is increasingly used in some cases.

When resins for interior and exterior parts of an automobile are used as described above, a primer is usually applied to an adhesion surface of a resin member, and an adhesive is then applied followed by adhering.

To eliminate a step of applying a primer, a method in which the adhesion surface of the resin member is subjected to a dry treatment such as a flame treatment, a corona treatment, a plasma treatment, and ITRO treatment, in advance, and a predetermined adhesive is applied directly to the adhesion surface followed by adhering, to produce an adhesion member (multilayer member) has also been proposed (for example, Japan Unexamined Patent Publication No. 2014-25000).

The inventors of the present technology have found that when a multilayer member is produced by using a dry treatment and an adhesive without using a primer with reference to Japan Unexamined Patent Publication No. 2014-25000, the adhesiveness of the multilayer member is not necessarily sufficient.

SUMMARY

The present technology provides a cleaning agent composition that improves the adhesiveness of a multilayer member to be produced by using the cleaning agent composition before a dry treatment when the multilayer member is produced using the dry treatment and an adhesive without using a primer.

The present inventors found that when a surface of a member is cleaned with a cleaning agent composition including a compound having a (meth)acryloyl group and a liquid having a boiling point of not higher than 200° C. in advance before a dry treatment, the adhesiveness of a multilayer member to be produced is improved.

Specifically, the present technology provides the following.

[1] A cleaning agent composition for use in an adhesion process for applying an adhesive to a surface of a first member subjected to a dry treatment without a primer, and adhering a second member to the surface of the first member, the cleaning agent composition comprising a compound (A) having a (meth)acryloyl group and a liquid (B) having a boiling point of not higher than 200° C.

[2] The cleaning agent composition according to [1], wherein the compound (A) having a (meth)acryloyl group is at least one selected from the group consisting of a (meth)acrylamide compound (a1), a compound (a2) having two or more (meth)acryloyl groups and a divalent aliphatic hydrocarbon group having two or more carbon atoms in the molecule, and a compound (a3) having a (meth)acryloyl group, an isocyanate group, and a divalent aliphatic hydrocarbon group having two or more carbon atoms in the molecule.

[3] The cleaning agent composition according to [1] or [2], further comprising a photopolymerization initiator (C).

[4] The cleaning agent composition according to any one of [1] to [3], further comprising a modified olefin compound (D).

[5] The cleaning agent composition according to [4], wherein the modified olefin compound (D) is an olefin compound modified by at least one selected from the group consisting of acid modification, chlorination modification, and acrylic modification.

[6] The cleaning agent composition according to any one of [1] to [5], wherein the dry treatment is at least one selected from the group consisting of a corona treatment, a plasma treatment, a flame treatment, ITRO treatment, an UV treatment, and an excimer treatment, and the adhesive is at least one selected from the group consisting of an urethane-based adhesive, an epoxy-based adhesive, a modified silicone-based adhesive, and an acrylic adhesive.

As described below, the present technology can provide a cleaning agent composition that improves the adhesiveness of a multilayer member to be produced by using the cleaning agent composition before a dry treatment when the multilayer member is produced using the dry treatment and an adhesive without using a primer.

DETAILED DESCRIPTION

Hereinafter, a method of producing a multilayer member of the present technology will be described.

Note that in the present specification, numerical ranges indicated using "(from) . . . to . . . " include the former number as the lower limit value and the latter number as the upper limit value.

A cleaning agent composition of the present technology (hereinafter also referred to as "cleaning agent of the present technology") is used in an adhesion method for applying an adhesive to a surface of a first member subjected to a dry treatment without a primer, and adhering a second member to the surface of the first member. The cleaning agent composition of the present technology is used in cleaning the surface of the first member before the dry treatment in advance.

The cleaning agent composition of the present technology comprises a compound (A) having a (meth)acryloyl group and a liquid (B) having a boiling point of not higher than 200° C.

In the present technology, the surface of the member to be subjected to the dry treatment is cleaned with the cleaning agent composition comprising the compound (A) having a (meth)acryloyl group and the liquid (B) having a boiling point of not higher than 200° C. in advance before the dry treatment, as described above. Thus, the adhesiveness of the multilayer member to be produced is improved.

Although this reason is not clear in detail, this reason is considered as follows. When the surface is cleaned and then subjected to the dry treatment (e.g., plasma treatment), the surface of the member subjected to the dry treatment is reacted due to polymerization of a part of the compound (A) having a (meth)acryloyl group in the cleaning agent composition, or the like, and the energy state of the surface is increased. Therefore, the surface is easily reacted with an adhesive.

Next, the compound (A) having a (meth)acryloyl group and the liquid (B) having a boiling point of not higher than 200° C. in the cleaning agent of the present technology, and an optional component will be described.

[Compound (A) Having (Meth)Acryloyl Group]

The compound (A) having a (meth)acryloyl group in the cleaning agent composition of the present technology is not particularly limited as long as it is a compound having one or more (meth)acryloyl groups in the molecule.

Herein, the "(meth)acryloyl group" refers to an acryloyl group ($CH_2$=CHCO—) or a methacryloyl group ($CH_2$=C($CH_3$)CO—).

Similarly, "(meth)acrylate" refers to acrylate or methacrylate.

From the viewpoint of high self-reactivity, it is preferable that the compound (A) having a (meth)acryloyl group be a (meth)acrylamide compound (a1).

Examples of the (meth)acrylamide compound (a1) include acrylamide, methacrylamide, and a compound of which a nitrogen atom of an amide linkage is bonded to at least one alkyl group optionally having a heteroatom. Specific examples of the compound include N,N-dimethylacrylamide, N,N-diethylacrylamide, N,N-dimethylaminopropylacrylamide and the like.

It is preferable that the compound (A) having a (meth)acryloyl group be a compound having two (meth)acryloyl groups in the molecule (hereinafter also referred to as "multifunctional (meth)acrylate compound") from the viewpoint of promoting an increase in molecular weight by a polymerization reaction.

Specific examples of the compound having two (meth)acryloyl groups in the molecule include ethylene glycol di(meth)acrylate, 1,3-propylene glycol di(meth)acrylate, 1,4-heptanediol di(meth)acrylate, 1,6-hexanediol di(meth)acrylate, diethylene glycol di(meth)acrylate, neopentyl glycol di(meth)acrylate, tetraethylene glycol di(meth)acrylate, 2-butyne-1,4-di(meth)acrylate, cyclohexane-1,4-dimethanol di(meth)acrylate, hydrogenated bisphenol A di(meth)acrylate, 1,5-pentane di(meth)acrylate, trimethylolethane di(meth)acrylate, tricyclodecanyl di(meth)acrylate, hydrogenated products thereof, trimethylolpropane di(meth)acrylate, dipropylene glycol di(meth)acrylate, 1,3-butylene glycol di(meth)acrylate, 2,2-bis(4-(meth)acryloxypropoxyphenyl)propane, 2,2-bis(4-(meth)acryloxy(2-hydroxypropoxy)phenyl)propane, bis(2-methacryloyloxyethyl)phthalate and the like.

Specific examples of a compound having three (meth)acryloyl groups in the molecule include trimethylolpropane tri(meth)acrylate represented by the following Formula (1) (hereinafter also abbreviated as "TMPTA"), pentaerythritol tri(meth)acrylate, dipentaerythritol tri(meth)acrylate and the like.

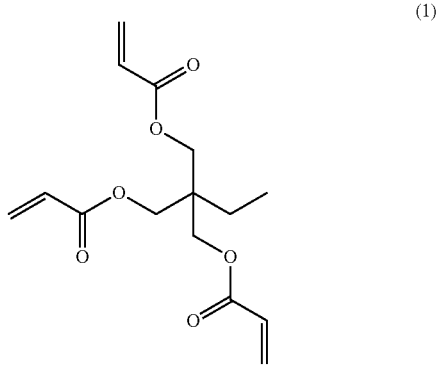 [SMILES: C=CC(=O)OCC(CC)(COC(=O)C=C)COC(=O)C=C]

(1)

Specific examples of a compound having four (meth)acryloyl groups in the molecule include pentaerythritol tetra(meth)acrylate, dipentaerythritol tetra(meth)acrylate, tripentaerythritol tetra(meth)acrylate and the like.

Specific examples of a compound having five (meth)acryloyl groups in the molecule include dipentaerythritol penta(meth)acrylate, dipentaerythritol hexa(meth)acrylate represented by the following Formula (2) (hereinafter also abbreviated as "DPHA"), tripentaerythritol penta(meth)acrylate, tripentaerythritol hexa(meth)acrylate, tripentaerythritol hepta(meth)acrylate, tripentaerythritol octa(meth)acrylate and the like.

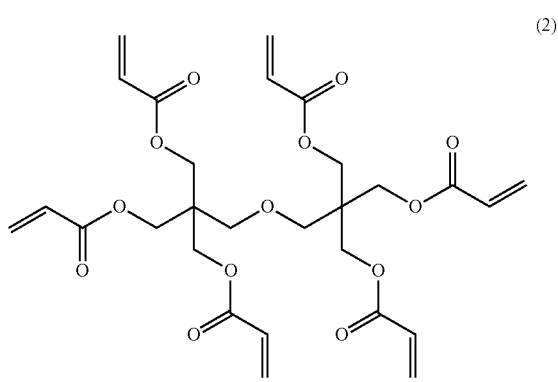 [SMILES: C=CC(=O)OCC(COCC(COC(=O)C=C)(COC(=O)C=C)COC(=O)C=C)(COC(=O)C=C)COC(=O)C=C]

(2)

It is preferable that the compound (A) having a (meth)acryloyl group be a compound (a2) having two or more (meth)acryloyl groups and a divalent aliphatic hydrocarbon group having two or more carbon atoms in the molecule, and/or a compound (a3) having a (meth)acryloyl group, an isocyanate group, and a divalent aliphatic hydrocarbon group having two or more carbon atoms in the molecule. This is because an increase in molecular weight is likely to be promoted due to a larger number of reactive sites.

Herein, examples of the "divalent aliphatic hydrocarbon group having two or more carbon atoms" in the molecules of the compounds (a2) and (a3) include an alkylene group having from 2 to 15 carbon atoms. Specific examples thereof include an ethylene group, a propylene group, a butylene group, a pentylene group, and a hexylene group.

The compound (a2) can be prepared by reacting a mixture of the multifunctional (meth)acrylate compound described above with a multifunctional (meth)acrylate compound partially having a hydroxyl group, with an aliphatic polyisocyanate such as hexamethylene diisocyanate (HDI), trimethylhexamethylene diisocyanate (TMHDI), lysine diisocyanate, and norbornane diisocyanate (NBDI). The compound prepared by such a reaction may have an isocyanate group. It is preferable that the equivalent weight ratio (NCO/OH) of the isocyanate group to the hydroxyl group be from 0.5 to 3.

Examples of the compound (a3) include 2-isocyanatoethyl acrylate, 2-isocyanatoethyl methacrylate, 3-isocyanatopropyl acrylate, 3-isocyanatopropyl methacrylate, 2-isocyanato-1-methylethyl acrylate, 2-isocyanato-1-methylethyl methacrylate, 3-acryloyloxyphenyl isocyanate, 3-methacryloyloxyphenyl isocyanate, 3-isocyanato-2-methylbutyl acrylate, 3-isocyanato-2-methylbutyl methacrylate, 4-acryloyloxyphenyl isocyanate, 4-methacryloyloxyphenyl isocyanate, 3-acryloyloxyphenyl isocyanate, 3-methacryloyloxyphenyl isocyanate, 2-acryloyloxyphenyl isocyanate, 2-methacryloyloxyphenyl isocyanate, 3,5-bis(methacryloyloxyethyl)phenyl isocyanate, 2,4-bis(acryloyloxy)phenyl isocyanate, 1,1-bis(acryloyloxymethyl)ethyl isocyanate, 1,1-bis(methacryloyloxymethyl)ethyl isocyanate, acryloyl isocyanate, methacryloyl isocyanate and the like.

The content of the compound (A) having a (meth)acryloyl group is preferably from 0.5 to 10 mass %, and more preferably from 1 to 8 mass %, relative to the whole amount of the composition.

The content of the compound (A) having a (meth)acryloyl group is preferably from 0.5 to 10 parts by mass, and more preferably from 1 to 8 parts by mass, relative to 100 parts by mass of the liquid having a boiling point of not higher than 200° C. described below.

[Liquid (B) Having Boiling Point of not Higher than 200° C.]

The liquid (B) having a boiling point of not higher than 200° C. in the cleaning agent of the present technology is a component mainly used as a solvent. The liquid (B) having a boiling point of not higher than 200° C. is a substance having a boiling point of not higher than 35° C. and flowability at least at from 15 to 35° C.

Examples of the liquid (B) having a boiling point of not higher than 200° C. include water and an organic solvent.

The organic solvent is not particularly limited as long as it has a boiling point of not higher than 200° C. Examples thereof include aliphatic hydrocarbons such as n-pentane, isopentane, neopentane, n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and isooctane; alicyclic hydrocarbons such as cyclopentane, cyclohexane, and methyl cyclopentane; aromatic hydrocarbons such as xylene, benzene, and toluene; ketones such as methyl ethyl ketone (MEK), methyl isobutyl ketone (MIBK), and cyclohexanone; and alcohols such as propylene glycol monomethyl ether (PGME) and isopropyl alcohol (IPA). One type of these may be used alone or two or more types of these may be used in combination.

[Photopolymerization Initiator (C)]

It is preferable that the cleaning agent of the present technology include a photopolymerization initiator (C). This is because the reaction of the compound (A) having a (meth)acryloyl group can be promoted by using an energy during a dry treatment.

Examples of the photopolymerization initiator (C) include carbonyl compounds such as an alkylphenone-based compound, a benzoin ether-based compound, and a benzophenone-based compound, sulfur compounds, azo compounds, peroxide compounds, and phosphine oxide-based compounds.

Specific examples thereof include carbonyl compounds such as acetophenone, benzoin, benzoin methyl ether, benzoin ethyl ether, benzoin isopropyl ether, acetoin, butyroin, toluoin, benzyl, benzophenone, p-methoxybenzophenone, diethoxyacetophenone, α,α-dimethoxy-α-phenylacetophenone, methylphenylglyoxylate, ethylphenylglyoxylate, 4,4'-bis(dimethylaminobenzophenone), 2-hydroxy-2-methyl-1-phenylpropan-1-one, and 1-hydroxycyclohexyl phenyl ketone represented by the following Formula (3); sulfur compounds such as tetramethylthiuram monosulfide and tetramethylthiuram disulfide; azo compounds such as azobisisobutyronitrile and azobis-2,4-dimethylvaleronitrile; and peroxide compounds such as benzoyl peroxide and di-tert-butyl peroxide. One type of these may be used alone or two or more types of these may be used in combination.

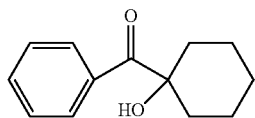

(3)

Among these, 1-hydroxycyclohexyl phenyl ketone, 2-hydroxy-2-methyl-1-phenyl-propan-1-one, and 1-[4-(2-hydroxyethoxy)-phenyl]-2-hydroxy-2-methyl-1-propan-1-one are preferable from the viewpoint of light stability, high efficiency of photocleavage, compatibility with the curable monomer, low volatility, and low odor.

Examples of a commercially available product of 1-hydroxycyclohexyl phenyl ketone include IRGACURE 184 (available from Ciba Specialty Chemicals).

When the photopolymerization initiator (C) is contained, the content of the photopolymerization initiator (C) is preferably from 1 to 10 parts by mass, and more preferably from 2 to 8 parts by mass, relative to 100 parts by mass of the compound (A) having a (meth)acryloyl group.

[Modified Olefin Compound (D)]

The cleaning agent composition of the present technology preferably contains a modified olefin compound (D). This is because the modified olefin compound (D) has high affinity with a base material.

Herein, the modified olefin compound is a compound in which a double bond (C=C) of an alkene is modified. The modified olefin compound is preferably an olefin compound modified by at least one selected from the group consisting of acid modification, chlorination modification, and acrylic modification. Examples thereof include a modified polymer in which an olefin-based resin obtained by polymerization of an olefinic monomer described below is modified with an unsaturated carboxylic acid, and a modified polymer in which an olefin-based resin obtained by polymerization of an olefinic monomer described below is partially chlorinated.

Examples of the olefinic monomer include olefinic monomers such as ethylene, propylene, 1-butene, 2-butene, isobutylene, 1-pentene, 2-pentene, 4-methyl-pentene, 2-methyl-1-butene, 2-methyl-2-butene, 1-hexene, 2,3-dimethyl-2-butene, 1-heptene, 1-octene, 1-nonene, and 1-decene; and diolefinic monomers such as allene, 1,2-butadiene, 1,3-butadiene, 1,3-pentadiene, 1,4-pentadiene, 1,5-hexadiene, and cyclopentadiene.

When the modified olefin compound (D) is contained, the content of the modified olefin compound (D) is preferably from 0.1 to 50 parts by mass, and more preferably from 1 to 20 parts by mass, relative to 100 parts by mass of the compound (A) having a (meth)acryloyl group.

[Optional Component]

The cleaning agent of the present technology may include various additives such as a filler, a curing catalyst, a plasticizer, an anti-aging agent, an antioxidant, a pigment (dye), a thixotropic agent, an UV absorber, a flame retardant, a surfactant (including a leveling agent), a dispersant, a dehydrating agent, an adhesion promoter, and an antistatic agent, if necessary, without impairing the object of the present technology.

The cleaning agent of the present technology including such components is a cleaning agent composition used in an adhesion method (hereinafter formally referred to as "adhesion method of the present technology") for applying an adhesive to a surface of a first member that has been subjected to a dry treatment as described above without a primer, and adhering a second member to the surface of the first member. The cleaning agent of the present technology is a cleaning agent composition for cleaning the surface of the first member before the dry treatment in advance.

Subsequently, the first member, dry treatment, adhesive, and second member in the adhesion method of the present technology will be described in detail.

[First Member]

The first member preferably a member (preferably a base material) containing a crystalline thermoplastic resin. When the first member is used as an exterior part for an automobile, such as a back door of an automobile, it is preferable that the first member be used as a member located on the inside (inner member).

The crystalline thermoplastic resin is not particularly limited as long as it is a thermoplastic resin having crystallizability. Specific examples thereof include a polyolefin-based resin such as polyethylene, polypropylene, and polybutylene; a methacrylic resin such as polymethyl methacrylate; a polystyrene-based resin such as polystyrene, ABS, and AS; a polyester-based resin such as polyethylene terephthalate (PET), polybutylene terephthalate (PBT), polytrimethylene terephthalate, polyethylene naphthalate (PEN), and poly(1,4-cyclohexyldimethylene terephthalate) (PCT); a polyamide resin selected from a nylon resin and a nylon copolymeric resin such as polycaproamide (nylon 6), polyhexamethyleneadipamide (nylon 66), polyhexamethylenesebacamide (nylon 610), polyhexamethylenedodecamide (nylon 612), polydodecanamide (nylon 12), polyhexamethyleneterephthalamide (nylon 6T), polyhexamethyleneisophthalamide (nylon 6I), a polycaproamide/polyhexamethyleneterephthalamide copolymer (nylon 6/6T), a polyhexamethyleneadipamide/polyhexamethyleneterephthalamide copolymer (nylon 66/6T), and a polyhexamethyleneadipamide/polyhexamethyleneisophthalamide copolymer (nylon 66/6I); a polyvinyl chloride resin; polyoxymethylene (POM); a polycarbonate (PC) resin; a polyphenylenesulfide (PPS) resin; a modified polyphenylene ether (PPE) resin; a polyetherimide (PEI) resin; a polysulfone (PSF) resin; a polyether sulfone (PES) resin; a polyketone resin; a polyether nitrile (PEN) resin; a polyether ketone (PEK) resin; a polyetherether ketone (PEEK) resin; a polyether ketone ketone (PEKK) resin; a polyimide (PI) resin; a polyamideimide (PAI) resin; a fluororesin; modified resins obtained by modifying the resins, and a mixture of the resins. Among these, a polyolefin-based resin is preferable, polyethylene and polypropylene are more preferable, and polypropylene is further preferable. The first member may include two or more types of crystalline thermoplastic resins.

The content of the crystalline thermoplastic resin in the first member is preferably from 10 to 100 mass %, and more preferably from 60 to 100 mass %.

The first member is preferably a composite member including the crystalline thermoplastic resin and an inorganic substance. Examples of the inorganic substance include silica, titanium oxide, magnesium oxide, antimony oxide, aluminum hydroxide, magnesium hydroxide, calcium hydroxide, calcium carbonate, talc, clay, mica, glass fibers, carbon black, graphite, carbon fibers and the like. The first member may include two or more types of inorganic substances.

When the first member is a base material (flat plate), the thickness thereof is not particularly limited, and is preferably from 1 μm to 100 mm.

[Dry Treatment]

The type of the dry treatment is not particularly limited. The dry treatment is preferably at least one selected from the group consisting of a corona treatment, a plasma treatment, a flame treatment, ITRO treatment, an UV treatment (ultraviolet irradiation treatment), and an excimer treatment, more preferably a flame treatment, a plasma treatment, a corona treatment, or ITRO treatment, and further preferably a flame treatment, a plasma treatment, or a corona treatment.

The dry treatment may include a single dry treatment (once) (e.g., single sweeping treatment) or a plurality of single dry treatments (a plurality of times) (e.g., a plurality of sweeping treatments). When the dry treatment includes a plurality of single dry treatments, the single dry treatments may be performed without interval (continuous treatment), or the member may be subjected to the single dry treatment, cooling, and the subsequent single dry treatment (intermittent treatment).

<Flame Treatment>

The flame treatment is a method for treating a surface using a flame.

In the flame treatment, a conventionally known method such as a method using a burner may be used.

The gas pressure in the flame treatment is preferably from 0.005 to 10 MPa, and more preferably from 0.01 to 1.5 MPa.

The speed in the flame treatment is preferably from 100 to 2000 mm/s, and more preferably from 200 to 1000 mm/s.

When the flame treatment is performed by using a burner, the distance between the burner and the surface of the first member is preferably from 10 to 600 mm, and more preferably from 20 to 400 mm.

<Plasma Treatment>

The plasma treatment is a method for treating a surface using plasma discharge.

The plasma treatment is not particularly limited. Examples thereof include an atmospheric pressure plasma treatment and a vacuum plasma treatment. Among these, an atmospheric pressure plasma treatment that can be used in-line is preferable.

A plasma gas (processing gas) used in the plasma treatment is not particularly limited. Examples thereof include a nitrogen gas, a helium gas, and an argon gas, and a mixed gas including the aforementioned gas with one or more of an oxygen gas, a carbon dioxide gas, and a hydrogen gas.

The speed in the plasma treatment is preferably from 10 to 1500 mm/s, and more preferably from 50 to 1000 mm/s.

When the plasma treatment is performed by using a plasma discharge nozzle, the distance between the plasma discharge nozzle and the surface of the first member is preferably from 1 to 100 mm, and more preferably from 5 to 50 mm.

<Corona Treatment>

The corona treatment is a method for treating a surface using corona discharge.

The speed in the corona treatment is preferably from 10 to 1000 mm/s, and more preferably from 20 to 500 mm/s.

When the corona treatment is performed by using a corona discharge nozzle, the distance between the corona discharge nozzle and the surface of the member is preferably from 1 to 100 mm, and more preferably from 5 to 50 mm.

<ITRO Treatment>

In the ITRO treatment, a silane compound or the like is introduced into a fuel gas to form a flame, and the flame is used to treat the surface. Thus, a nano-level silicon oxide film is formed on the surface, and the adhesive properties between the surface and the adhesive are enhanced.

The gas pressure in the ITRO treatment is preferably from 0.005 to 10 MPa, and more preferably from 0.01 to 1.5 MPa.

The speed in the ITRO treatment is preferably from 100 to 2000 mm/s, and more preferably from 200 to 1000 mm/s.

When the ITRO treatment is performed by using a burner, the distance between the burner and the surface of the member is preferably from 1 to 600 mm, and more preferably from 20 to 400 mm.

[Adhesive]

The adhesive is not particularly limited. Specific examples thereof include an acrylic adhesive, a rubber-based adhesive, a silicone-based adhesive, an urethane-based adhesive, an α-olefin-based adhesive, an ether-based adhesive, an ethylene-vinyl acetate resin-based adhesive, an epoxy resin-based adhesive, a vinyl chloride resin-based adhesive, a chloroprene rubber-based adhesive, a cyanoacrylate-based adhesive, an aqueous polymer-isocyanate-based adhesive, a styrene-butadiene rubber-based adhesive, a nitrile rubber-based adhesive, a nitrocellulose-based adhesive, a reactive hot melt-based adhesive, a phenolic resin-based adhesive, a modified silicone-based adhesive, a polyamide resin-based adhesive, a polyimide-based adhesive, a polyurethane resin-based adhesive, a polyolefin resin-based adhesive, a polyvinyl acetate resin-based adhesive, a polystyrene resin solvent-based adhesive, a polyvinyl alcohol-based adhesive, a polyvinylpyrrolidone resin-based adhesive, a polyvinyl butyral resin-based adhesive, a polybenzimidazole-based adhesive, a polymethacrylate resin-based adhesive, a melamine resin-based adhesive, a urea resin-based adhesive, a resorcinol-based adhesive and the like. The adhesive is preferably at least one selected from the group consisting of an urethane-based adhesive, an epoxy-based adhesive, a modified silicone-based adhesive, and an acrylic adhesive, and more preferably an urethane-based adhesive.

It is preferable that the urethane-based adhesive and the epoxy-based adhesive be a one-part or two-part adhesive.

Examples of a one-part urethane-based adhesive include a moisture-curing adhesive including an urethane prepolymer having an isocyanate group.

Examples of a two-part urethane-based adhesive include an adhesive including a main agent containing a polyol and a curing agent containing isocyanate.

Examples of a one-part epoxy-based adhesive include a normal temperature-curing or heating-curing adhesive including a latent curing agent such as ketimine, oxazolidine, and an aldimine compound and a liquid epoxy resin.

Examples of a two-part epoxy resin-based adhesive include an adhesive including a main agent selected from a liquid epoxy resin (e.g., a bisphenol A type epoxy resin, a bisphenol F type epoxy resin, a bisphenol AD type epoxy resin, or a novolac epoxy resin), and a curing agent (e.g., a linear aliphatic amine, a cyclic aliphatic amine, or an aromatic amine, a nitrogen-containing aromatic amine-based curing agent such as an imidazole compound, or an amidoamine curing agent).

<Applying Method>

A method for applying the adhesive to the surface of the first member that has been subjected to the dry treatment is not particularly limited. Examples thereof include a dip coating method, a double roll coater, a slit coater, an air knife coater, a wire bar coater, a slide hopper, spray coating, a blade coater, a doctor coater, a squeeze coater, a reverse roll coater, a transfer roll coater, an extrusion coater, a curtain coater, a dip coater, a die coater, a coating method by gravure roll, a screen printing method, a dip coating method, a spray coating method, a spin coating method, and an inkjet method.

The thickness of an adhesive layer to be formed is not particularly limited, and is preferably from 0.1 to 20 mm.

[Second Member]

A material for the second member is not particularly limited, and examples thereof include a resin, a glass, and a metal. Examples of the resin include the crystalline thermoplastic resin described above.

When the second member is used as an exterior part for an automobile, such as a back door of an automobile, it is preferable that the second member be used as a member located on the outside (outer member).

From the viewpoint of further improving the adhesiveness between the second member and the adhesive layer, a surface of the second member may be subjected to coating or the aforementioned dry treatment before adhering the second member.

<Adhering Method>

A method for adhering the second member to the adhesive layer is not particularly limited, and examples thereof include a compression bonding method. To cure the adhesive, a heating treatment or the like may be performed after adhering the second member.

[Use]

Since a multilayer member produced by the adhesion process of the present technology has excellent adhesiveness, the multilayer member is especially useful in interior and exterior parts of an automobile, such as a body, a front door, a rear door, a back door, a front bumper, a rear bumper, and a rocker molding of an automobile.

EXAMPLES

The present technology is described in further detail below with reference to examples. However, the present technology is not limited to these examples.

[Preparation of Adhesive]

Components shown in Table 1 below were mixed at a composition (part by mass) shown in Table 1 by an agitator, to prepare a main agent shown in an upper part of Table 1 and a curing agent shown in a lower part of Table 1.

Subsequently, 100 g of the prepared main agent and 10 g of the curing agent were mixed to obtain an adhesive 1.

TABLE 1

|  |  | Adhesive 1 | Adhesive 2 |
|---|---|---|---|
| Main agent | Polymer 1 | 42.4 |  |
|  | Polymer 2 |  | 29.9 |
|  | Epoxy resin 1 |  | 2.8 |
|  | Epoxy resin 2 |  | 11.4 |
|  | Compound 1 | 1.7 |  |
|  | Compound 2 | 0.3 |  |
|  | Carbon black | 20.6 | 3.3 |
|  | Calcium carbonate 1 | 19.3 | 7.9 |
|  | Calcium carbonate 2 |  | 41.5 |
|  | Plasticizer 1 | 15.5 |  |
|  | Plasticizer 2 |  | 3.1 |
|  | Catalyst 1 | 0.2 |  |
|  | Total | 100.0 | 100.0 |
| Curing agent | Compound 3 | 45.9 | 9.8 |
|  | Compound 4 | 5.0 |  |
|  | Compound 5 | 2 |  |
|  | Compound 6 |  | 5.2 |
|  | Compound 7 |  | 2.5 |
|  | Compound 8 |  | 31.3 |
|  | Calcium carbonate 2 | 46.8 | 46.0 |

TABLE 1-continued

|  | Adhesive 1 | Adhesive 2 |
|---|---|---|
| Catalyst 1 | 0.3 |  |
| Catalyst 2 |  | 5.2 |
| Total | 100.0 | 100.0 |
| Main agent/curing agent (mass ratio) | 10/1 | 10/1 |

Details of the components in Table 1 are as follows.

Polymer 1: urethane prepolymer synthesized as described below 700 g of polyoxypropylenediol (average molecular weight: 2000), 300 g of polyoxypropylenetriol (average molecular weight: 3000), and 499 g of 4,4'-diisocyanate-phenylmethane (molecular weight: 250) were mixed (at this time, NCO/CO=2.0), 500 g of diisononyl phthalate was further added, and the mixture was stirred at 80° C. for 12 hours in a nitrogen gas stream, resulting in a reaction. As a result, an urethane prepolymer (polymer 1) containing 2.10% of isocyanate group was synthesized.

Polymer 2: Kaneka MS polymer S203 (available from Kaneka Corporation)

Epoxy resin 1: ADEKA RESIN EP-4100 (available from ADEKA Corporation)

Epoxy resin 2: ADEKA RESIN EP-4006 (available from ADEKA Corporation)

Compound 1: isocyanurate form of hexamethylene diisocyanate (Tolonate HDT available from Perstorp)

Compound 2: Daimaron (available from Yasuhara Chemical Co., Ltd.)

Compound 3: trifunctional polypropylene polyol (EXCENOL 1030 available from Asahi Glass Co., Ltd.)

Compound 4: polybutadienediol (Poly bd R-45HT available from Idemitsu Kosan Co., Ltd., hydroxyl value: 0.8 mol/kg)

Compound 5: terpineol (available from Yasuhara Chemical Co., Ltd.)

Compound 6: 3-glycidoxypropyltrimethoxysilane Sila-Ace S-510 (available from Chisso Corporation)

Compound 7: vinyltrimethoxysilane KBM 1003 (available from Shin-Etsu Chemical Co., Ltd.)

Compound 8: ketimine-type latent curing agent Epicure H-30 (available from Mitsubishi Chemical Corporation)

Carbon black: trade name #200 MP (available from NSCC Carbon Co., Ltd.)

Calcium carbonate 1: Super S (available from Maruo Calcium Co., Ltd.)

Calcium carbonate 2: KALFAIN 200 (available from Maruo Calcium Co., Ltd.)

Plasticizer 1: diisononyl phthalate (available from Jay Plus, Inc.)

Plasticizer 2: ShellSol™ (available from Japan Chemtech Ltd.)

Catalyst 1: dimorpholinodiethyl ether (available from San-Apro Ltd.)

Catalyst 2: tin catalyst NEOSTANN U-303 (available from Nitto Kasei Co., Ltd.)

Examples 1 to 8 and Comparative Examples 1 to 3

Components shown in Table 2 below were mixed at a composition (part by mass) shown in Table 2 by an agitator, to prepare a cleaning agent.

[Evaluation]

<Cleaning Property>

A surface of a base material (first member) (content of polypropylene: 80 mass %, content of inorganic substance (glass filler): 20 mass %) (width: 25 mm, length: 120 mm, thickness: 3 mm) formed from a polypropylene composite material (R-200G available from Prime Polymer Co., Ltd.) was coated with an ink of a felt marker.

The surface of the composite material at a portion where the ink of the felt marker was applied was wiped off twice by using a gauze impregnated with the prepared cleaning agent.

When the ink of the felt marker was removed, the cleaning agent was evaluated to be excellent in cleaning property, which was represented by "Good." When the ink of the felt marker was not removed and remained on the base material, the cleaning agent was evaluated to be poor in cleaning property, which was represented by "Poor."

<Adhesiveness>

The surface cleaned with the cleaning agent in the evaluation of cleaning property was subjected to a plasma treatment under each of the following conditions 1 to 3. The adhesive immediately after preparation (mixing) (see Table 2 below) was applied to the surface so that the thickness was 3 mm. Another base material (material: polypropylene) (width: 25 mm, length: 120 mm, thickness: 3 mm) (second member) was adhered to the surface, compression-bonded, and allowed to stand in an environment of 23° C. and a relative humidity of 50% for three days to prepare a test sample.

Condition 1: output power: 21 kHz, distance: 10 mm, speed: 150 mm/min

Condition 2: output power: 21 kHz, distance: 15 mm, speed: 175 mm/min

Condition 3: output power: 21 kHz, distance: 20 mm, speed: 150 mm/min

The prepared test sample was subjected to a tensile test at 23° C. in accordance with HS K6850:1999, and evaluated according to the following criteria. The results are shown in Table 2 below.

(Evaluation Criteria)

Excellent: When a failure state was visually observed and a cohesive failure was observed in the adhesive, the test sample was evaluated as "CF." The CF thereof was not less than 95%.

Good: A failure state was visually observed. The CF of the test sample was not less than 80% and less than 95%.

Marginal: A failure state was visually observed. The CF of the test sample was not less than 50% and less than 80%.

Poor: When a failure state was visually observed and an interfacial peeling was observed between an adherend and the adhesive, the test sample was evaluated as "AF." The AF thereof was greater than 50%.

TABLE 2

|  | Example | | | | | |
|---|---|---|---|---|---|---|
|  | 1 | 2 | 3 | 4 | 5 | 6 |
| Compound having a (meth)acryloyl group A-1 | 5.00 | 2.50 | 2.50 | 2.50 | | |

TABLE 2-continued

|  | | | | | | |
|---|---|---|---|---|---|---|
| Compound having a (meth)acryloyl group A-2 |  |  |  |  | 5.88 |  |
| Compound having a (meth)acryloyl group A-3 |  |  |  |  |  | 5.88 |
| Photo-polymerization initiator C-1 | 0.25 | 0.13 | 0.13 | 0.13 | 0.25 | 0.25 |
| Modified olefin compound D-1 |  | 2.50 |  |  |  |  |
| Modified olefin compound D-2 |  |  | 2.50 |  |  |  |
| Modified olefin compound D-3 |  |  |  | 2.50 |  |  |
| Liquid having a boiling point of not higher than 200° C. B-1 | 94.75 | 47.38 | 47.38 | 47.38 | 93.87 | 93.87 |
| Liquid having a boiling point of not higher than 200° C. B-2 |  | 47.50 | 47.50 | 47.50 |  |  |
| Liquid having a boiling point of not higher than 200° C. B-3 |  |  |  |  |  |  |
| Total | 100.00 | 100.00 | 100.00 | 100.00 | 100.00 | 100.00 |
| Adhesive | 1 | 1 | 1 | 1 | 1 | 1 |
| Cleaning property | Good | Good | Good | Good | Good | Good |
| Adhesiveness (condition 1) | Good | Excellent | Excellent | Excellent | Good | Good |
| Adhesiveness (condition 2) | Good | Excellent | Excellent | Excellent | Good | Good |
| Adhesiveness (condition 3) | Good | Excellent | Excellent | Excellent | Good | Marginal |

|  | Example | | Comparative Example | | |
|---|---|---|---|---|---|
|  | 7 | 8 | 1 | 2 | 3 |
| Compound having a (meth)acryloyl group A-1 | 5.00 | 5.00 |  |  |  |
| Compound having a (meth)acryloyl group A-2 |  |  |  |  |  |
| Compound having a (meth)acryloyl group A-3 |  |  |  |  |  |
| Photopolymerization initiator C-1 |  | 0.25 |  |  |  |
| Modified olefin compound D-1 |  |  |  |  |  |
| Modified olefin compound D-2 |  |  |  |  |  |
| Modified olefin compound D-3 |  |  |  |  |  |
| Liquid having a boiling point of not higher than 200° C. B-1 | 95.00 | 94.75 | 100.00 |  |  |
| Liquid having a boiling point of not higher than 200° C. B-2 |  |  |  | 100.00 |  |
| Liquid having a boiling point of not higher than 200° C. B-3 |  |  |  |  | 100.00 |
| Total | 100.00 | 100.00 | 100.00 | 100.00 | 100.00 |
| Adhesive | 1 | 2 | 1 | 1 | 1 |
| Cleaning property | Good | Good | Good | Good | Poor |
| Adhesiveness (condition 1) | Good | Good | Poor | Poor | Good |
| Adhesiveness (condition 2) | Good | Good | Good | Good | Good |
| Adhesiveness (condition 3) | Marginal | Good | Poor | Poor | Poor |

Details of the components in Table 2 are as follows.

Compound having a (meth)acryloyl group A-1: N,N-diethylacrylyamide

Compound having a (meth)acryloyl group A-2: a reaction product of a multifunctional acrylate mixture having a hydroxyl group including as a main component dipentaerythritol hexacrylate (hydroxyl value: 50 mgKOH/g) with hexamethylene diisocyanate (NCO/OH) (NX103-198, N.V. 85%, available from Asia Industry Co., Ltd.)

Compound having a (meth)acryloyl group A-3: dipentaerythritol hexaacrylate

Photopolymerization initiator C-1: 1-hydroxycyclohexyl phenyl ketone (IRGACURE 184, available from BASF)

Modified olefin compound D-1: acid-modified polyolefin (XPO17N30, N.V. 30%, available from Mitsui Chemicals, Inc.)

Modified olefin compound D-2: chlorinated polyolefin (814HS, available from Nippon Paper Industries Co., Ltd.)

Modified olefin compound D-3: acryl-modified chlorinated olefin (S3305S, available from Nippon Paper Industries Co., Ltd.)

Liquid having a boiling point of not higher than 200° C.
B-1: n-hexane

Liquid having a boiling point of not higher than 200° C.
B-2: cyclohexane

Liquid having a boiling point of not higher than 200° C.
B-3: water

As clear from Table 2, when the cleaning agent containing no liquid (B) having a boiling point of not higher than 200° C. is used in cleaning, the adhesiveness is deteriorated depending on the condition of dry treatment after the cleaning (Comparative Examples 1 to 3).

On the other hand, when the cleaning agent containing the liquid (B) having a boiling point of not higher than 200° C. and the compound (A) having a (meth)acryloyl group is used in cleaning, the adhesiveness is improved regardless of the condition of dry treatment after the cleaning (Examples 1 to 8).

The comparison of Examples 1 to 4 showed that mixing of the modified olefin compound (D) improves adhesiveness.

The comparison of Examples 5 and 6 showed that when the compound (A) having a (meth)acryloyl group is the compound (a2) having two or more (meth)acryloyl groups and a divalent aliphatic hydrocarbon group having two or more carbon atoms in the molecule, the adhesiveness is improved.

The comparison of Examples 1 and 7 showed that mixing of the photopolymerization initiator (C) improves adhesiveness.

The invention claimed is:

1. A cleaning agent composition for use in an adhesion process for applying an adhesive to a surface of a first member subjected to a dry treatment without a primer, and adhering a second member to the surface of the first member, the cleaning agent composition comprising a compound (A) having a (meth)acryloyl group, a liquid (B) having a boiling point of not higher than 200° C., and a photopolymerization initiator (C), wherein:
a content of the compound (A) is from 0.5 to 8 parts by mass relative to 100 parts by mass of the liquid (B), and the compound (A) having a (meth)acryloyl group is at least one selected from the group consisting of a (meth)acrylamide compound (a1), a compound (a2) having two or more (meth)acryloyl groups and a divalent aliphatic hydrocarbon group having six or more carbon atoms in a molecule, and a compound (a3) having a (meth)acryloyl group, an isocyanate group, and a divalent aliphatic hydrocarbon group having two or more carbon atoms in a molecule.

2. The cleaning agent composition according to claim 1, further comprising a modified olefin compound (D).

3. The cleaning agent composition according to claim 2, wherein the modified olefin compound (D) is an olefin compound modified by at least one selected from the group consisting of acid modification, chlorination modification, and acrylic modification.

4. The cleaning agent composition according to claim 1, wherein the dry treatment is at least one selected from the group consisting of a corona treatment, a plasma treatment, a flame treatment, ITRO treatment, an UV treatment, and an excimer treatment, and the adhesive is at least one selected from the group consisting of an urethane-based adhesive, an epoxy-based adhesive, a modified silicone-based adhesive, and an acrylic adhesive.

5. The cleaning agent composition according to claim 2, wherein the dry treatment is at least one selected from the group consisting of a corona treatment, a plasma treatment, a flame treatment, ITRO treatment, an UV treatment, and an excimer treatment, and the adhesive is at least one selected from the group consisting of an urethane-based adhesive, an epoxy-based adhesive, a modified silicone-based adhesive, and an acrylic adhesive.

6. The cleaning agent composition according to claim 3, wherein the dry treatment is at least one selected from the group consisting of a corona treatment, a plasma treatment, a flame treatment, ITRO treatment, an UV treatment, and an excimer treatment, and the adhesive is at least one selected from the group consisting of an urethane-based adhesive, an epoxy-based adhesive, a modified silicone-based adhesive, and an acrylic adhesive.

* * * * *